United States Patent
Horiba

(10) Patent No.: US 7,305,000 B2
(45) Date of Patent: Dec. 4, 2007

(54) COMMUNICATION TERMINAL EQUIPMENT AND COMMUNICATION SYSTEM INCORPORATING THE SAME AND COMMUNICATION MANAGEMENT METHOD THEREFOR

(75) Inventor: Kazuhiro Horiba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1041 days.

(21) Appl. No.: 10/369,814

(22) Filed: Feb. 18, 2003

(65) Prior Publication Data

US 2003/0179763 A1 Sep. 25, 2003

(30) Foreign Application Priority Data

Feb. 18, 2002 (JP) .............................. 2002-039835
Nov. 29, 2002 (JP) .............................. 2002-347140

(51) Int. Cl.
H04L 12/56 (2006.01)
G06F 15/16 (2006.01)
H04Q 7/20 (2006.01)

(52) U.S. Cl. ..................... 370/401; 709/237; 455/435.1

(58) Field of Classification Search ................. 370/352
See application file for complete search history.

(56) References Cited

U.S. PATENT DOCUMENTS

| | | | |
|---|---|---|---|
| 5,479,481 A | * | 12/1995 | Koivunen .................... 455/433 |
| 6,144,653 A | * | 11/2000 | Persson et al. .............. 370/337 |
| 6,167,283 A | * | 12/2000 | Korpela et al. ............. 455/525 |
| 6,603,849 B2 | * | 8/2003 | Lin et al. ................ 379/221.01 |
| 6,611,685 B1 | * | 8/2003 | Rune et al. ................... 455/433 |
| 6,622,016 B1 | * | 9/2003 | Sladek et al. ............. 455/414.1 |
| 6,992,985 B1 | * | 1/2006 | Das ............................ 370/252 |
| 7,035,646 B2 | * | 4/2006 | Raffel et al. ............. 455/456.1 |
| 2003/0152068 A1 | * | 8/2003 | Balasaygun et al. ........ 370/356 |

OTHER PUBLICATIONS

Toga et al., "Demystifying Multimedia Conferencing Over the Internet Using the H.323 Set of Standards", 2nd quarter, 1998, download from <http://www.intel.com/technology/itj/q21998/pdf/h323.pdf.>.*

U.S. Appl. No. 10/033,469 of Kazuhiro Horiba, filed Dec. 27, 2001.

* cited by examiner

*Primary Examiner*—Wing Chan
*Assistant Examiner*—Gregory B. Sefcheck
(74) *Attorney, Agent, or Firm*—Cooper & Dunham LLP

(57) ABSTRACT

Contents of a self-terminal information table are compared with the contents of a registered self-terminal information table at or upon start-up after power-on and if a match is not met therebetween registration is made to the gatekeeper equipment after performing unregister operation thereto, thus ensuring advantageously that the contents of the self-terminal information table used in a self-terminal always match the contents registered in the gatekeeper equipment thereby to enable any associated terminal equipment to use the gatekeeper equipment appropriately.

23 Claims, 7 Drawing Sheets

(a)

| Call control port No. |
| --- |
| Alias |
| IP address of GK |
| RAS port No. |
| IP address of self terminal |

(Self-terminal information table)

(b)

| Call control port No. |
| --- |
| Alias |
| IP address of GK |
| RAS port No. |
| IP address of self-terminal |

(Registered self terminal information table)

FIG. 6

COMMUNICATION TERMINAL EQUIPMENT AND COMMUNICATION SYSTEM INCORPORATING THE SAME AND COMMUNICATION MANAGEMENT METHOD THEREFOR

BACKGROUND OF THE INVENTION

1. Field of the Invention

The present invention relates to communication terminal equipment and communication system incorporating the same and communication management method therefor. More particularly, the present invention relates to communication terminal equipment using a packet transmission network as a communication line and having a function capable of using services provided by a communication management terminal connected to the packet transmission network, to communication terminal equipment having a communication facility conforming to TTC JT-H323 standard and using packet transmission network as a communication line and having a function capable of using services provided by gatekeeper equipment connected to the packet transmission network, and to a communication system comprising a communication management terminal connected to a packet transmission network and a plurality of communication terminal equipment units using a packet transmission network as a communication line and having a function capable of using services provided by the communication management terminal and a communication management method for such a communication system.

2. Description of Related Art

As a communication system using a packet transmission network such as the Internet is a known communication system conforming to JT-H323 Standard provided by TTC (The Telecommunications Technology Committee, a Japanese standards committee) (hereinafter shall be referred to as TTC JT-H323 Standard).

This TTC JT-H323 Standard covers technical requirements for multimedia communication system in such packet networks that do not necessarily guarantee a quality of service.

As such packet networks are covered local area networks, corporate area networks, metropolitan area networks, intranets, and any interconnected networks including Internet.

In addition, PPP or other packet mode transmission by point-to-point connection or dial-up connection over GSTN (general switched telephone network) or ISDN (Integrated Service Digital Network) are also covered.

Further, these networks may consist of a single segment each, or may have such a complicated topology having a plurality of interconnected network segments.

The communication system subject to this TTC JT-H323 Standard includes one type embodied in such a manner that its call control is accomplished by applying gatekeeper equipment thereto.

Here, the gatekeeper equipment is defined as an end point in a network that provides real-time two-way communication between JT-H323 terminals on a packet network and between TTC terminals on a switched network or with other JT-H323 gateways. Also, other TTC terminals are defined as including those subject to JT-H310 (JT-H320 applied to B-ISDN), JT-H320 (ISDN), JTH321 (ATM), JT-H322 (a quality of service (QoS) guaranteed LAN), JT-H324 (GSTN), JT-H324M (mobile communications), and ITU-T recommendation V.70 (DSVD). Based on such a definition as above, VoIP (Voice over IP) telephone terminals are also put under control of gatekeeper equipment.

In this connection, the JT-H323 terminal is a communication terminal having a communication facility conforming to TTC JT-H323 Standard. Those terminals which are mentioned herein with a TTC standard number or an ITU-T recommendation number shall denote communication terminals or the like having a communication facility conforming to respectively corresponding TTC standards or ITU-T recommendations. For details of standards or recommendations referred to herein, reference should be made specifically to appropriate documents describing the same.

In JT-H323 terminal equipment using gatekeeper equipment, predetermined various kinds of information required for call control or the like functions are usually registered in such gatekeeper equipment. This registration in such JT-H323 terminal equipment is usually performed upon its start-up after power-on or when the predetermined various kinds of information were updated.

In the meantime, if JT-H323 terminal equipment has its power turned off before the predetermined various kinds of information after being updated are completely reregistered (registered again after deletion of the preceding information), occasionally the gatekeeper equipment may not allow such amended information to be registered upon start-up after next power-on, thus giving rise to an undesirable situation in which all communication via the gatekeeper equipment is disabled.

Accordingly, it is an object of the present invention to provide such communication terminal equipment, a communication system, and a communication management method that enable and ensure a proper function of communication using gatekeeper equipment.

SUMMARY OF THE INVENTION

In one aspect of the present invention, communication terminal equipment using a packet transmission network as a communication line and having a function capable of using services provided by a communication management terminal connected to said packet transmission network comprises means for communicating a communication management message with said communication management terminal, a self-terminal information table storing various kinds of information that should be registered in said communication management terminal, a registered self-terminal information table for storing said various kinds of information registered in said communication management terminal, and a control means which at or upon start-up compares contents of said self-terminal information table with those of said registered self-terminal information table, sends a predetermined registered information delete message to said communication management terminal with reference to the contents of said self-terminal information table for causing said management terminal to delete any information on the self-terminal registered therein if the contents of said registered self-terminal information table differ from the contents of said self-terminal information table, then sends a predetermined information register message to said communication management terminal with reference to the contents of said self-terminal information table for causing said management terminal to newly register information on the self-terminal, and subsequently stores the contents of said self-terminal information table in said registered self-terminal information table.

In another aspect of the present invention, communication terminal equipment having a communication facility conforming to TTC JT-H323 Standard and using packet transmission network as a communication line and having a function capable of using services provided by gatekeeper equipment connected to said packet transmission network comprises a RAS (Registration, Admissions, and Status signaling function) communication means for communicating a RAS message with said gatekeeper equipment a self-terminal information table storing various kinds of information that should be registered in said gatekeeper equipment, a registered self-terminal information table for storing said various kinds of information registered in said gatekeeper equipment, and a control means which at or upon start-up compares contents of said self-terminal information table with those of said registered self-terminal information table, sends a predetermined URQ (Unregister Request) message to said gate keeper equipment with reference to the contents of said self-terminal information table for causing said gate keeper equipment to delete any information on the self-terminal registered therein if the contents of said registered self-terminal information table differ from the contents of said self-terminal information table, then sends a predetermined RRQ (Register Request) message to said gate keeper equipment with reference to the contents of said self-terminal information table for causing said gate keeper equipment to newly register information on the self-terminal, and subsequently stores the contents of said self-terminal information table in said registered self-terminal information table.

According to the present invention, the above-described various kinds of information may include information on a call signaling channel port number. Also, the various kinds of information may include information an alias registered or assigned to said self-terminal. Further, the various kinds of information may include an IP address of said gatekeeper equipment. Furthermore, the various kinds of information may include information on a UDP (User Datagram Protocol) port number, for communicating a RAS message with said gatekeeper equipment. Moreover, the various kinds of information include an IP address assigned to said self-terminal.

In yet another aspect, the present invention provides a communication system comprising a communication management terminal connected to a packet transmission network and a plurality of communication terminal equipment units using a packet transmission network as a communication line and having a function capable of using services provided by said communication management terminal, in which said communication terminal equipment units each comprises a communication means for communicating a communication management message with said communication management terminal, a self-terminal information table storing various kinds of information that should be registered in said communication management terminal, a registered self-terminal information table for storing said various kinds of information registered in said communication management terminal, and a control means which at or upon start-up compares contents of said self-terminal information table with those of said registered self-terminal information table, sends a predetermined registered information delete message to said communication management terminal with reference to the contents of said self-terminal information table for causing said management terminal to delete any information on the self-terminal registered therein if the contents of said registered self-terminal information table differ from the contents of said self-terminal information table, then sends a predetermined information register message to said communication management terminal with reference to the contents of said self-terminal information table for causing said management terminal to newly register information on the self-terminal, and subsequently stores the contents of said self-terminal information table in said registered self-terminal information table, and said communication management terminal comprises a terminal information registration management means which upon receiving said registered information delete message from a particular one of said communication terminal equipment units deletes any registered information on said particular communication terminal equipment unit stored therein and upon receiving said information register message from said particular communication terminal equipment unit registers a predetermined information on said particular communication terminal equipment unit based on the contents of said information register message received.

In still another aspect, the present invention provides a communication management method for a communication system comprising a communication management terminal connected to a packet transmission network and a plurality of communication terminal equipment units using a packet transmission network as a communication line and having a function capable of using services provided by said communication management terminal, in which said communication terminal equipment units, each comprising means for communicating a communication management message with said communication management terminal, a self-terminal information table storing various kinds of information that should be registered in said communication management terminal, and a registered self-terminal information table for storing said various kinds of information registered in said communication management terminal, compares contents of said self-terminal information table with those of said registered self-terminal information table at or upon start-up, is operative to send a predetermined registered information delete message to said communication management terminal with reference to the contents of said self-terminal information table for causing said management terminal to delete any information on the self-terminal registered therein if the contents of said registered self-terminal information table differ from the contents of said self-terminal information table, then send a predetermined information register message to said communication management terminal with reference to the contents of said self-terminal information table for causing said management terminal to newly register information on the self-terminal, and subsequently store the contents of said self-terminal information table in said registered self-terminal information table, and said communication management terminal is operative to delete, upon receiving said registered information delete message from a particular one of said communication terminal equipment units, any registered information on said particular communication terminal equipment unit stored therein and register, upon receiving said information register message from said particular communication terminal equipment unit, a predetermined information on said particular communication terminal equipment unit based on the contents of said information register message received.

In a further aspect of the present invention, communication terminal equipment having a communication facility conforming to TTC JT-H323 Standard and using packet transmission network as a communication line and having a function capable of using services provided by gatekeeper equipment connected to said packet transmission network comprises a RAS communication means for communicating a RAS message with said gatekeeper equipment, a self-terminal information table storing various kinds of information that should be registered in said gatekeeper equipment, a registered self-terminal information table for storing said various kinds of information registered in said gatekeeper equipment, and a control means which at or upon start-up subsequent to power-on compares contents of said self-terminal information table with those of said registered self-terminal information table, sends a predetermined URQ message to said gate keeper equipment with reference to the contents of said self-terminal information table for causing said gate keeper equipment to delete any information on the self-terminal registered therein if the contents of said registered self-terminal information table differ from the contents of said self-terminal information table, then sends a predetermined RRQ message to said gate keeper equipment with reference to the contents of said self-terminal information table for causing said gate keeper equipment to newly register information on the self-terminal, and subsequently stores the contents of said self-terminal information table in said registered self-terminal information table.

As described herein previously, the above-described various kinds of information may include information on a call signaling channel port number. Also, the various kinds of information may include information an alias registered or assigned to said self-terminal. Further, the various kinds of information may include an IP address of said gatekeeper equipment. Furthermore, the various kinds of information may include information on a UDP (User Datagram Protocol) port number for communicating a RAS message with said gatekeeper equipment. Moreover, the various kinds of information include an IP address assigned to said self-terminal.

BRIEF DESCRIPTION OF THE DRAWINGS

Hereinafter, the present invention will be described further in detail based on preferred embodiments with reference to the accompanying drawings, in which:

FIGS. 6(a) and 6(b) are schematic diagrams showing an example of a self-terminal information table and a registered self-terminal information table, respectively;

FIG. 8 is a flow chart showing an exemplary process flow which a T.38 terminal equipment follows immediately after power-on.

DESCRIPTION OF PREFERRED EMBODIMENTS

Figure 1:
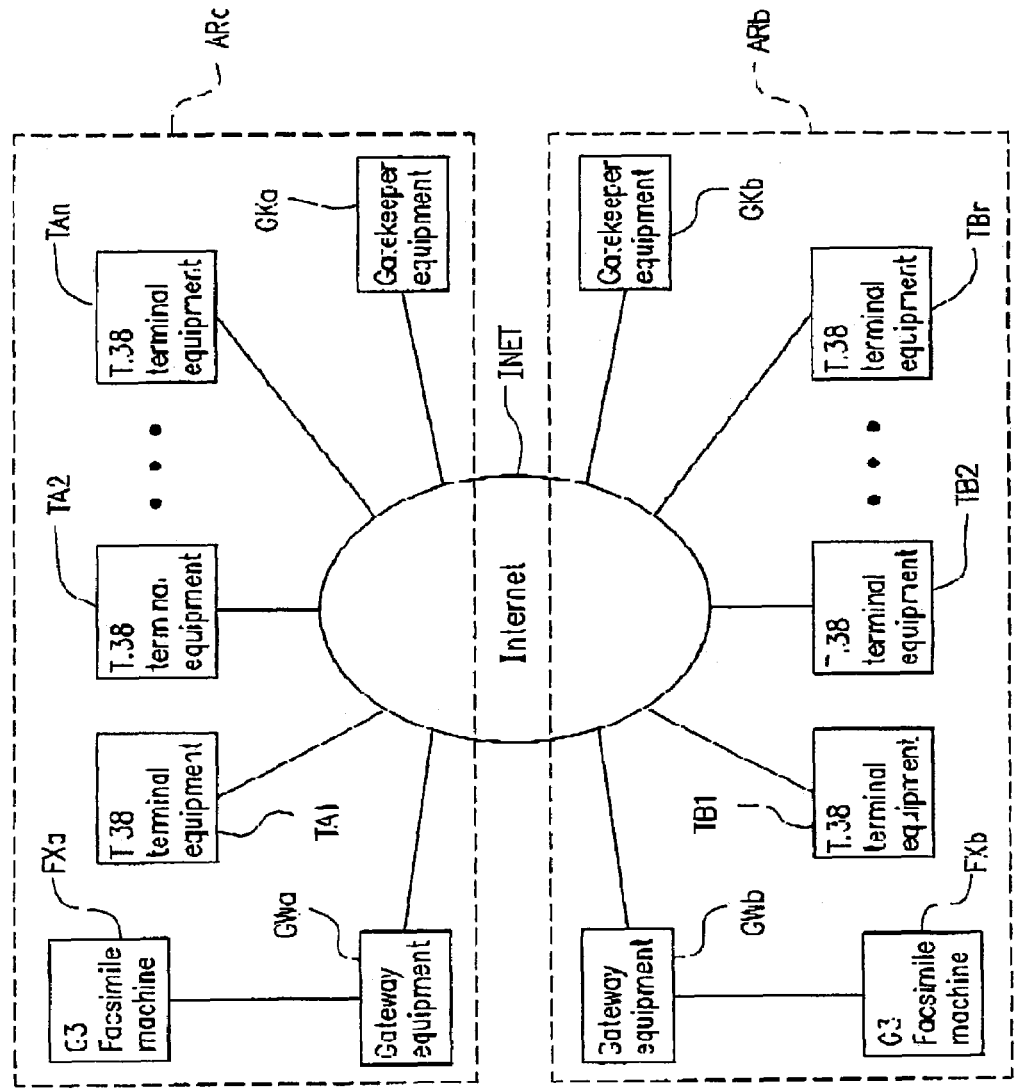
FIG. 1 is a block diagram of a preferred embodiment of the communication system according to the present invention.

Referring now to the accompanying drawing, especially to FIG. 1, there is schematically shown a block diagram of a preferred embodiment of the communication system according to present invention.

The communication system shown in FIG. 1 is a system conforming to TTC JT-H323 Standard and uses Internet INET as a packet transmission network, and the system covers two areas of ARa and ARb respectively including various terminal equipment units.

The area ARa includes a Group 3 (G3) facsimile machine FXa as a TTC terminal (communication terminal subject to any of TTC standards), a gateway equipment GWa as a JT-H323 gateway, a plurality of JT-H323 terminal equipment units including T.38 terminal equipment units TA1-TAn and a gatekeeper equipment GKa, and the other area ARb includes likewise a G3 facsimile machine FXb, a gateway equipment GWb, a plurality of T.38 terminal equipment units TB1-TBn and a gate a gatekeeper equipment GKb.

The T.38 terminal equipment herein referred to denotes any such terminal equipment conforming to ITU-T recommendation T.38 that realizes communications involving ITU-T recommendation T.30 terminal equipment (G3 facsimile machine) on a real-time basis using a packet transmission network.

As to communication mode for T.38 terminal equipment, two modes are provided for, including one in which T.38 terminal equipment units communicate directly each other via a packet transmission network and the other mode in which T.38 terminal equipment units communicate through gateway equipment with G3 facsimile machines connected to a public network PSTN.

That is, the gateway equipment GWa and GWb here have a function of realizing communications between T.38 terminal equipment units TA1-TAn, TB1-TBn and G3 facsimile machines FXa and FXb.

Figure 2:
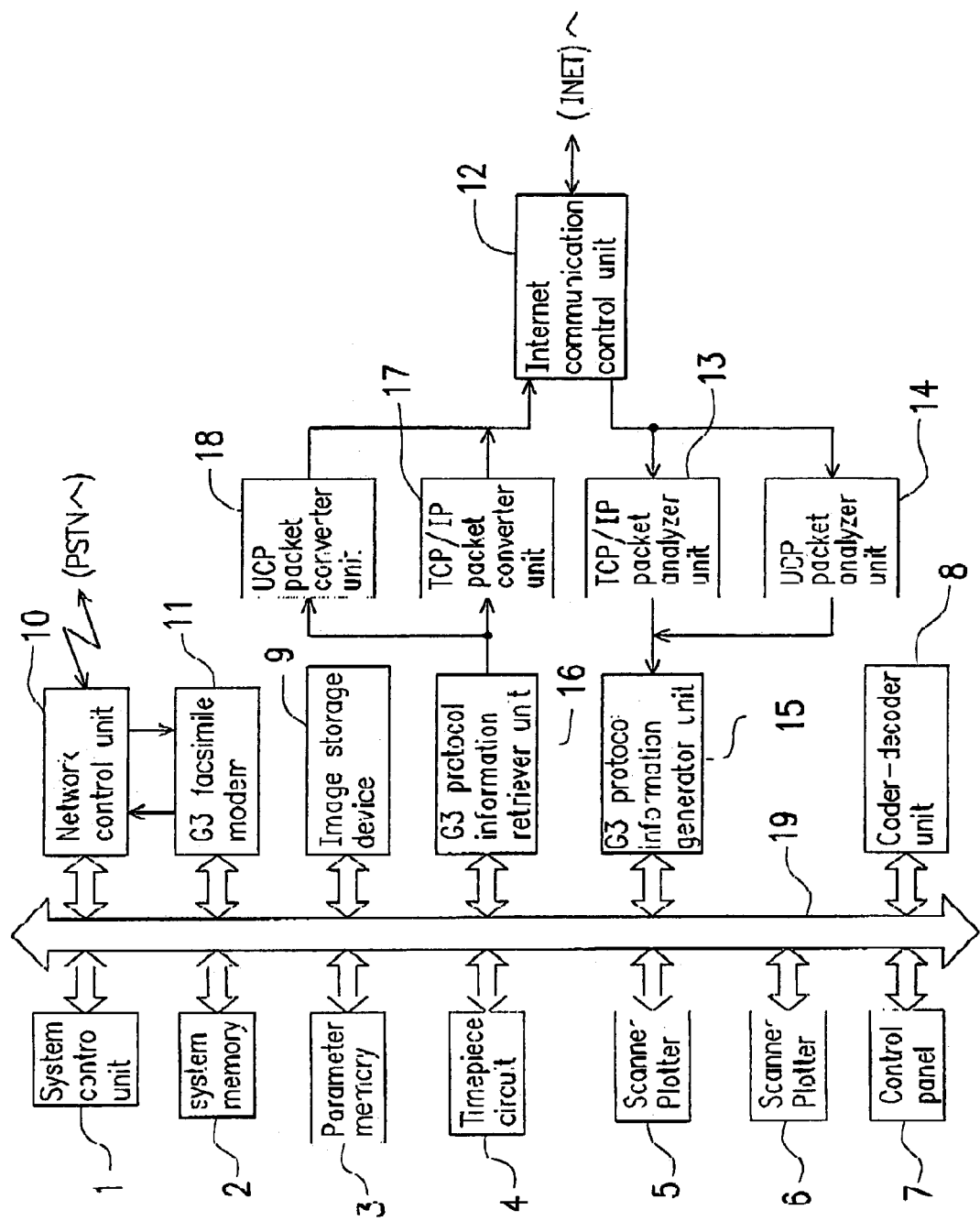
FIG. 2 is a block diagram showing an exemplary configuration of the T.38 terminal equipment (TA1-TAn, TB1-TBn)

FIG. 2 is a block diagram showing an exemplary configuration of the T.38 terminal equipment (TA1-TAn, TB1-TBn).

In the T.38 terminal equipment shown in FIG. 2, a system control unit 1 performs several controlling functions including control over other components of the equipment and processing of such as real-time transmission procedure (ITU-T recommendation T.38 procedure), and a system memory 2 is used to store a control and processing programs executed by the system control unit 1 and data required for execution of such programs, while the memory 2 providing a work area for the system control unit 1. A parameter memory 3 is used for storing various kinds of information peculiar to this particular T.38 terminal equipment, and a timepiece circuit 4 outputs time information.

A scanner 5 is used for reading images from source documents at a predetermined resolution, and a plotter 6 records and outputs the images at a predetermined resolution, while control panel 7 having various function keys and displays is used to operate this facsimile machine.

A coder-decoder unit 8 is used to code and compress image signals and inversely decode such coded and compressed information to original image signals, mainly for the purpose of error detection in the instant case. An image storage device 9 is used for storing a large volume of image information as coded and compressed.

The network control unit 10 connects this T.38 terminal equipment to a public telephone network PSTN and it has an automatic calling and answering function.

A G3 facsimile modem 11 accomplishes modem functions of G3 facsimile, including a low-speed modem function (V. 21 modem) for communicating a transmission procedure signal and a high-speed modem function (V. 17 modem, V.34 modem, V.29 modem, V.27ter modem, etc.) for communicating mainly image information.

An Internet communication control unit 12 connects this T.38 terminal equipment to Internet INET for communicating various data via Internet INET, and a TCP/IP packet analyzer unit 13 is used for analyzing TCP/IP packets received by the Internet communication control unit 12 to recover receiving information therefrom in TCP mode, while a UDP packet analyzer unit 14 analyzes UDP packets. received by the Internet communication control unit 12 to recover receiving information therefrom in UDP mode.

A group 3 protocol information generator unit 15 converts receiving information output from the TCP/IP packet analyzer unit 13 into corresponding G3 transmission procedure signal information in TCP mode in a real-time transmission procedure, while in UDP converting receiving information output from the UDP packet analyzer unit 14 into corresponding G3 transmission procedure signal information in the same procedure.

A G3 protocol information retriever unit 16 recovers transmitting G3 facsimile transmission procedure information in a real-time transmission procedure, and a TCP/IP packet converter unit 17 converts G3 facsimile transmission procedure information output from the G3 protocol information retriever unit 16 into TCP/IP packet data in TCP mode and its output data is provided to the Internet communication control unit 12.

A UDP packet converter unit 18 is used to converting G3 facsimile transmission procedure information output from the G3 protocol information retriever unit 16 into UDP packet data in UDP mode, and its output data is also provided to the Internet communication control unit 12.

The aforementioned system control unit 1, system memory 2, parameter memory 3, the timepiece circuit 4, scanner 5, plotter 6, control panel 7, coder-decoder unit 8, image storage device 9, network control unit 10, G3 facsimile modem 11, G3 protocol information generator unit 14 and G3 protocol information retriever unit 15 are all connected to an internal bus 17, and data communication between each of these elements is performed mainly through this internal bus 17.

Data are directly communicated between the network control unit 10 and the G3 facsimile modem 11.

Figure 3:
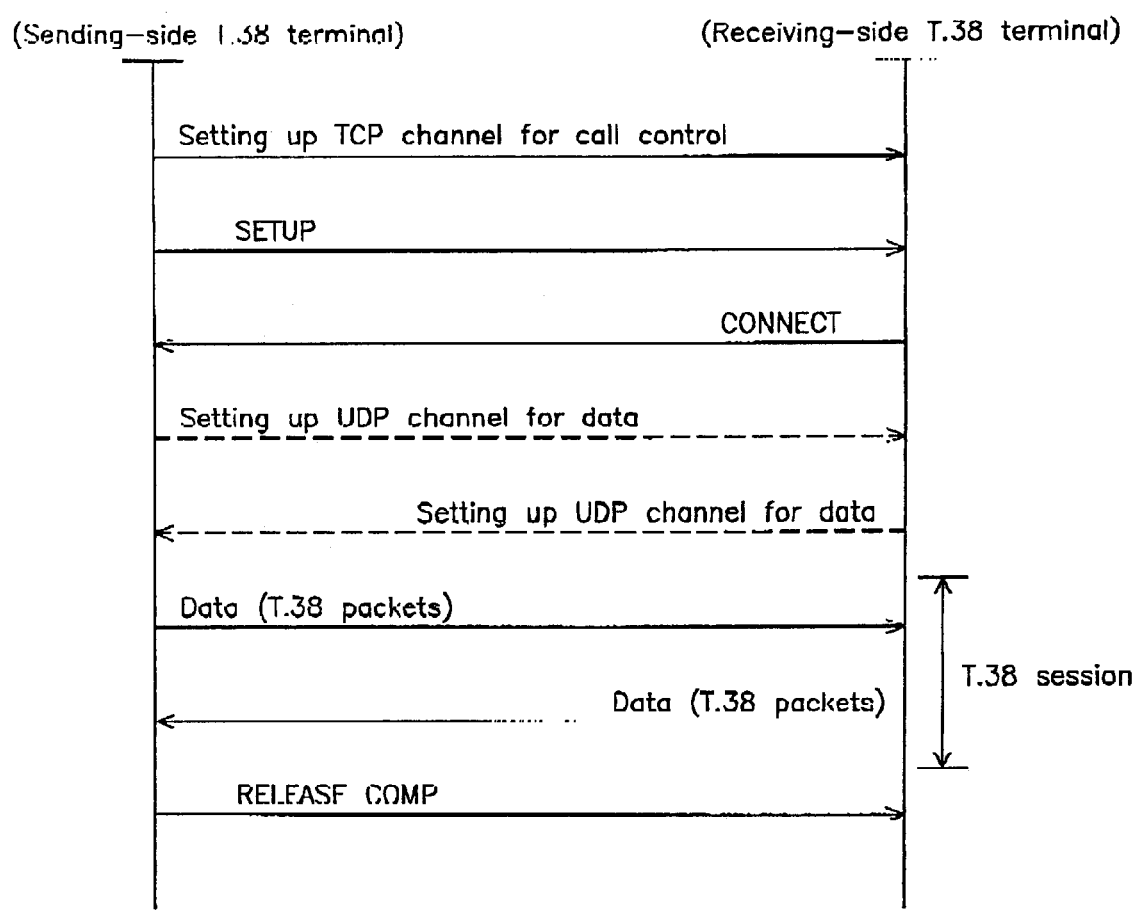
FIG. 3 is a time chart showing an example of data transmission procedure between T.38 terminal equipment units.

FIG. 3 is a chart showing an example of data transmission procedure between T.38 terminal equipment units.

In FIG. 3, sending-side T.38 terminal equipment first sets up a TCP channel for call control between receiving-side T.38 terminal equipment, and the subsequently the sending-side T.38 terminal equipment sends out a packet SETUP for call connection to the receiving-side T.38 terminal equipment.

Upon receiving the packet SETUP from the sending-side T.38 terminal equipment, the receiving-side T.38 terminal equipment responds to send a packet CONNECT to the sending-side T.38 terminal equipment, thereby setting up a call between the sending-side T.38 terminal equipment and the receiving-side T.38 terminal equipment. Also, the communication of these packets SETUP and Packet CONNECT between the sending-side and receiving-side T.38 terminal equipment sets a transport mode (either TCP mode or UDP mode) and the port number to be used.

Subsequently, the sending-side T.38 terminal equipment sets up a UDP channel for data going from the sending side to the receiving side, and the receiving-side T.38 terminal equipment sets up another UDP channel for data going from the receiving side to the sending side. Thereafter, between the sending-side T.38 terminal equipment and the receiving-side T.38 terminal equipment, data communication of T.38 subject to recommendation T.38 procedure is commenced using the two UDP channels thus set up, and communication of image information is performed.

Upon completion of the image information communication, the sending-side T.38 terminal equipment sends out a packet RELEASE COMP to the receiving-side T.38 terminal equipment thereby to end the operation of data communication between the sending-side T.38 terminal equipment and the receiving-side T.38 terminal equipment.

Figure 4:
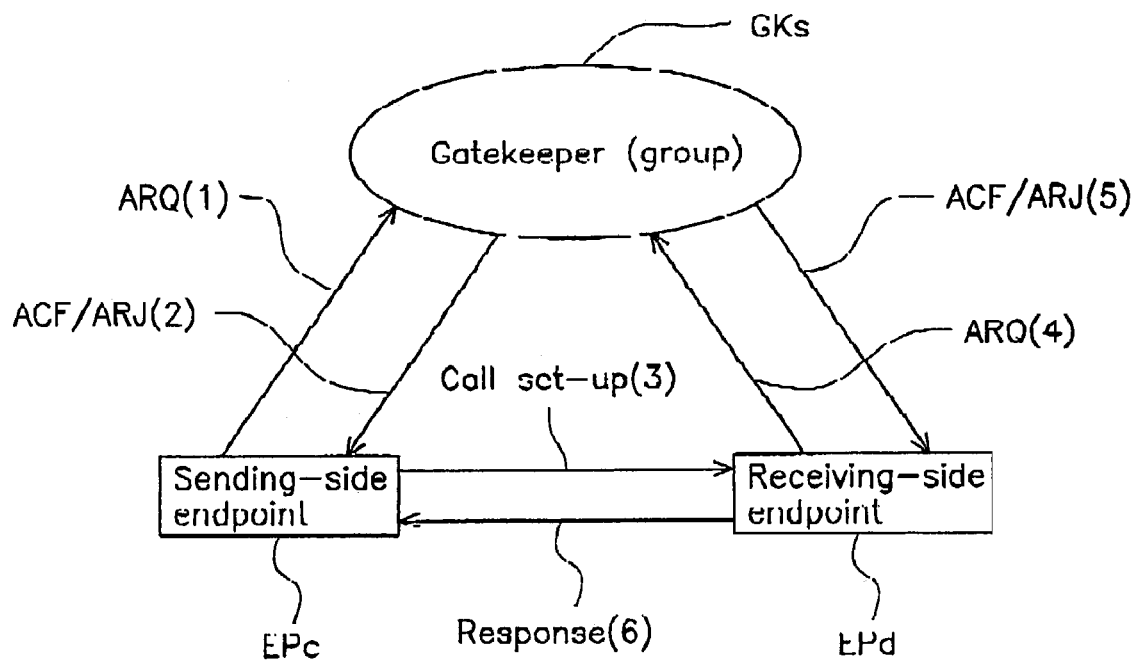
FIG. 4 is a schematic diagram showing an example of procedures for accomplishing call control of terminal equipment by using gatekeeper equipment.

FIG. 4 is a schematic diagram showing an example of procedures for accomplishing call control of terminal equipment by using gatekeeper equipment (see FIG. 10 of TTC JT-H323 Standard).

In FIG. 4, a sending-side endpoint (sending-side terminal equipment) EPc first sends out a call connection request (call-out) ARQ to gatekeeper equipment (group) GKs. Then, if the gatekeeper equipment (group) GKs can accept the call-connection demand (call-out), it sends out an answer ACF to the sending-side endpoint EPc, while sending out an answer ARJ to the sending-side endpoint EPc if it cannot accept the call-connection demand (call-out).

Upon receiving the answer ACF from the gatekeeper equipment (group) GKs, the sending-side endpoint EPc sends out a predetermined call set-up signal to a receiving-side endpoint EPd as a communication target.

Upon receiving the call set-up signal, the receiving-side endpoint EPd sends out a call-connection request (call-in) ARQ to the gatekeeper equipment (group) GKs. If the gatekeeper equipment (group) GKs can accept the call-connection request (call-in), it sends out an answer ACF to the receiving-side endpoint EPd, while sending out an answer ARJ to a receiving-side endpoint EPd if it cannot accept the call-connection request (call-in).

Upon receiving the answer ACF from the gatekeeper equipment (group) GKs, the receiving-side endpoint EPd sends out a predetermined response signal (acknowledgement) to the sending-side endpoint EPc.

In the manner as described hereinabove, a communication path is set up between the sending-side endpoint EPc and the receiving-side endpoint EPd to allow communication therebetween.

For an endpoint (terminal equipment) using gatekeeper equipment GK, it is required to register predetermined information regarding its self-terminal in gatekeeper equipment GK in advance. The registered information is held for a predetermined period in the gatekeeper equipment GK. Although this registration is usually carried out at or upon endpoint start-up, it may also be performed periodically as is necessary.

The "endpoint start-up" herein referred to denotes a start-up after a power-on of the endpoint or after a hardware or software reset. The above-describe registration is performed also when setting of the registered information about the endpoint is altered.

The information to be registered includes a call-control port number applied when performing a call-control procedure with the other side terminal, an alias registered in the self-terminal, and an IP address set in the terminal.

To update such registered information, it is necessary to once delete the registered information from gatekeeper equipment GK, and then to register new information (updated information). If the registered contents are not updated, repeated registration allows such registered information on the terminal to be kept in the gatekeeper equipment GK.

Figure 5:
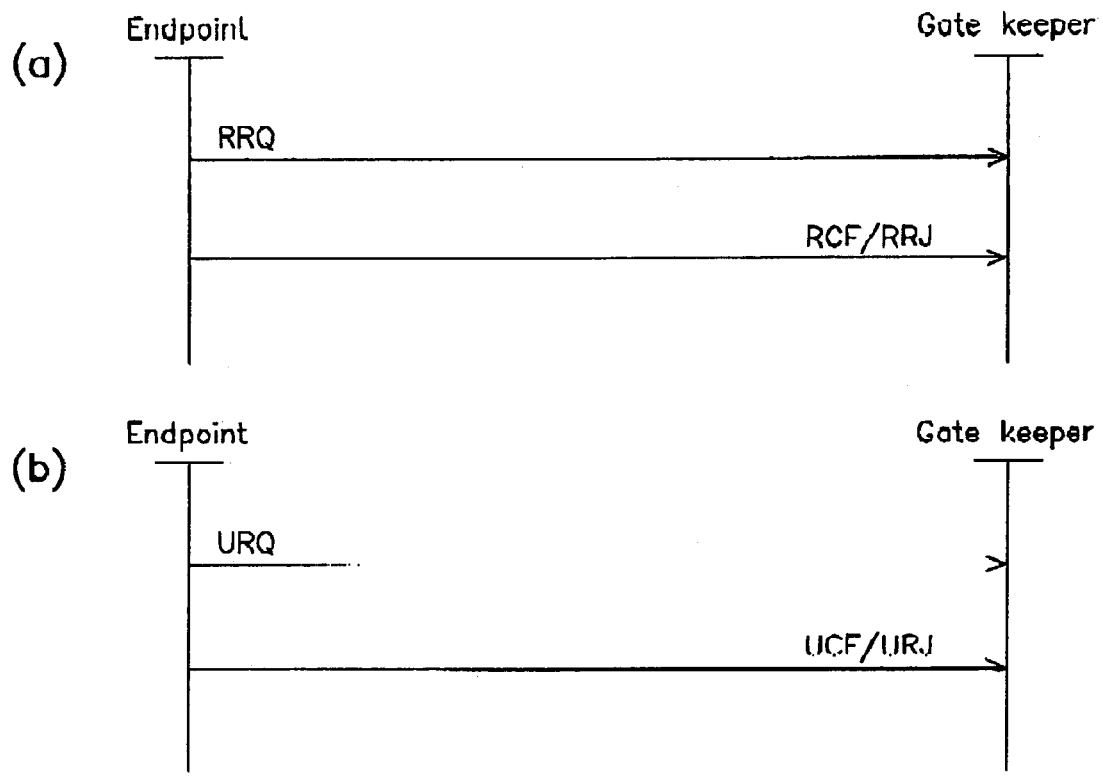
FIG. 5(a) is a time chart showing an example of RAS communication procedure performed between an endpoint and gatekeeper equipment GK when registering the endpoint in the gatekeeper equipment GK.
FIG. 5(b) is a time chart showing an example of RAS communication procedure performed when an endpoint deletes its relevant contents registered in gatekeeper equipment GK.

FIG. 5(a) is a chart showing an example of RAS communication procedure performed between an endpoint and gatekeeper equipment GK when registering the endpoint in the gatekeeper equipment GK. This RAS communication procedure is accomplished by using a RAS (Registration, Admissions, and Status signaling function) channel (namely, UDP mode communication channel).

First, an endpoint transmits a registration request message RRQ to gatekeeper equipment GK using a RAS channel. Upon receiving the registration request message RRQ, the gatekeeper equipment GK transmits response RCF to the endpoint as an acknowledgement if the message contents are proper and registerable. Also, the gatekeeper equipment GK registers the contents of the received registration request message RRQ.

Upon receiving the response RCF from the gatekeeper equipment GK, the endpoint recognizes that it has registered terminal in the gatekeeper equipment GK. Consequently the endpoint terminates end this RAS communication.

While, the gatekeeper equipment GK transmits a response RRJ to the endpoint as a negative acknowledgement, if the contents of the received register request message RRQ are not proper, for example in such a case as resulting in double registration.

FIG. 5(b) is a chart showing an example of RAS communication procedure performed when an endpoint deletes its relevant contents registered in gatekeeper equipment GK. This RAS communication procedure is performed using a RAS channel.

First, the endpoint transmits an unregister request message URQ to the gatekeeper equipment GK by using a RAS channel. Upon receiving the unregister request message URQ, the gatekeeper equipment GK transmits a response UCF as an acknowledgement to an endpoint, if the message contents are proper and registerable. Further, the gatekeeper equipment GK deletes registered contents corresponding to the contents of the received unregister request message URQ.

Upon receiving the response UCF from the gatekeeper equipment GK, the endpoint recognizes deletion of the registration of its self-terminal from the gatekeeper equipment GK to end this RAS communication.

Further, the gatekeeper equipment GK transmits response URJ to the endpoint as a negative acknowledgement, if the contents of the received unregister request message URQ are not proper, for example in such a case that there are no appropriate registered contents.

In the preferred embodiment, the T.38 terminal equipment which functions as an endpoint stores a terminal information table as shown in FIG. 6 (a) and a registered terminal information table as shown in this FIG. 6(b).

The terminal information table and the registered terminal information table contain identical items to each other. The items contained in these tables include call-control port number, alias, IP address of gatekeeper equipment GK, RAS port number representing a number of UDP port used as a RAS channel, and terminal IP address.

In the terminal information table, its contents are updated immediately when the data contents registered in the terminal are updated, for example by user operation. While, in the registered terminal information table, contents of the terminal information table are copied and generated after required contents among its elements are registered into gatekeeper equipment GK.

Thus, the T.38 terminal equipment can determine whether the contents of the registered information currently set in the terminal and the registered information in gatekeeper equipment GK match each other or not by comparing the contents of the terminal information table and the registered terminal information table.

In the instant preferred embodiment, it is arranged that the contents of the terminal information table are compared with the contents of the registered terminal information table at or upon start-up after power-on. If they do not match, registration is made to the gatekeeper equipment GK after performing unregister operation thereto. In this manner, it is ensured that the contents of the terminal information table used in the terminal always match the contents registered in the gatekeeper equipment GK thereby to enable the T.38 terminal equipment to use the gatekeeper equipment GK appropriately.

Also, at or upon start-up after power-on, a comparison is made between the contents of the terminal information table and the registered terminal information table, and normal operation for registration is performed if a match is met.

Figure 7:
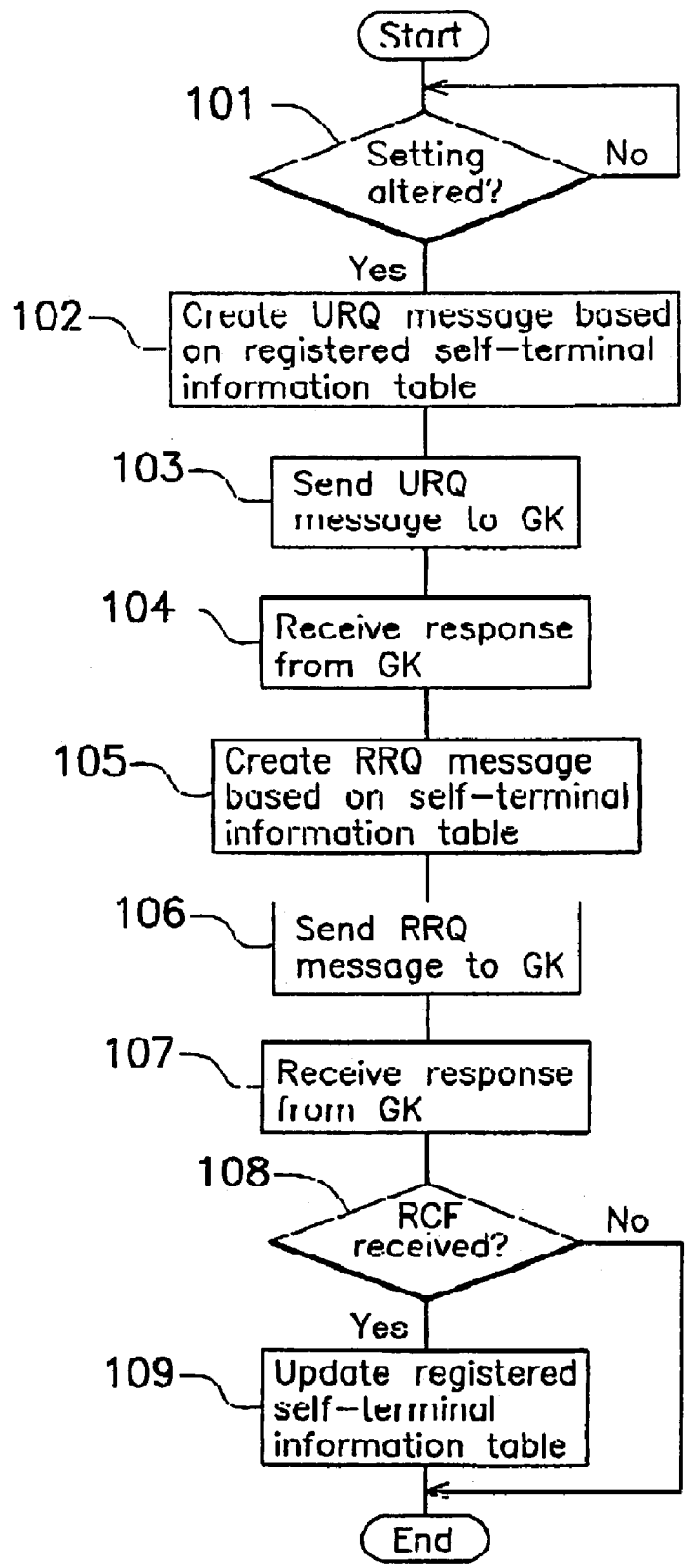
FIG. 7 is a flow chart showing an exemplary process flow which a T.38 terminal equipment follows when the contents of the information registered in its self-terminal have been updated by user operation and the contents of the self-terminal information table have been updated thereby.

FIG. 7 is a flow chart showing an exemplary process flow which a T.38 terminal equipment follows when the contents of the information registered in its terminal have been updated by user operation and the contents of the terminal information table have been updated thereby.

In FIG. 7, if the setting is changed (decision box 101 resulting in YES), a unregister request message URQ is created based on the contents of the registered terminal information table (step 102), and the thus created unregister request message URQ is sent out to a gatekeeper equipment GK (step 103).

If a response message is received from the gatekeeper equipment GK (step 104), a register request message RRQ is created based on the contents of the self-terminal information table (step 105), and the thus created unregister request message RRQ is sent out to the gatekeeper equipment GK (step 106).

Then, if a response message is received from the gatekeeper equipment GK (step 107), the T.38 terminal equipment examines whether the received response message is a response RCF (decision box 108). If the decision box 108 results in YES denoting a reception of a response RCF, the contents of the registered terminal information table are updated with the contents of the terminal information table (step 109), and the current operation is ended. While, if the decision box 108 results in NO, the current operation is ended bypassing the step 109 (error).

Figure 8:
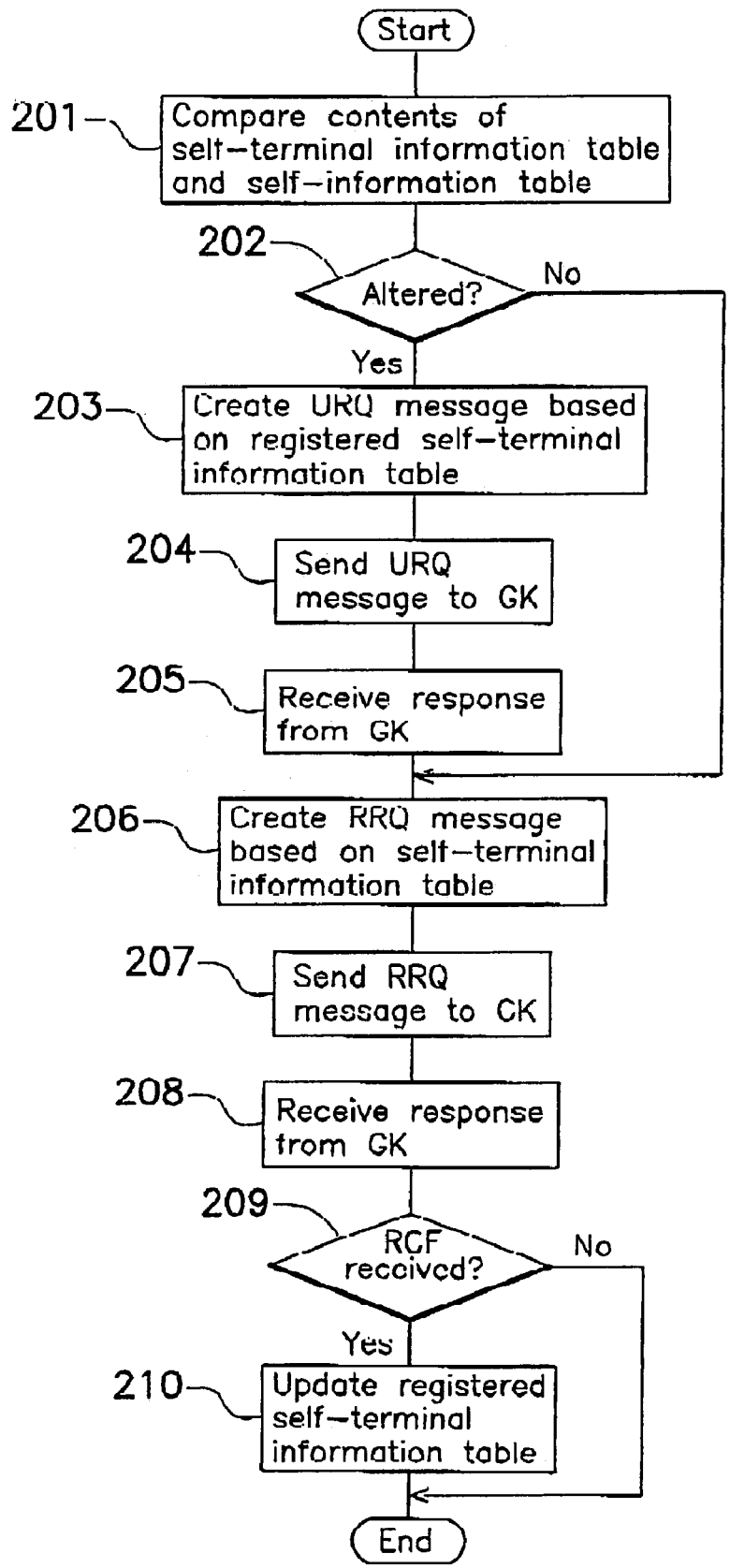

FIG. 8 is a flow chart showing an exemplary process flow which a T.38 terminal equipment follows immediately after power-on. This process is performed as a part of initialization at or upon start-up.

In FIG. 8, the contents of the terminal information table are first compared with the contents of the registered terminal information table (step 201) to determine whether there was any change (decision box 202). If the decision box 202 results in YES, a unregister request message URQ is created based on the contents of the registered terminal information table (step 203), and the thus created unregister request message URQ is sent out to a gatekeeper equipment GK (step 204).

Then, upon receiving a response message is received from the gatekeeper equipment GK (step 205), the T.38 terminal equipment creates a register request message RRQ based on the contents of the terminal information table (step 206), and sends out the created register request message RRQ to the gatekeeper equipment GK (step 207).

Then, if a response message is received from the gatekeeper equipment GK (step 208), the T.38 terminal equipment determines whether the received response message is a response RCF (decision box 209). If the decision box 209 results in YES denoting a reception of a response RCF, the contents of the registered self-terminal information table are updated with the contents of the terminal information table (step 210), and the current operation is ended. If the decision box 209 results in NO, the current operation is ended bypassing the step 210 (error).

On the other hand, if there is no change in the contents of the terminal information table and the registered terminal information table with the decision box 202 resulting in NO, the process proceeds to step 206, where a unregister request message RRQ created based on the contents of the terminal information table is sent to the gatekeeper equipment GK.

It is to be noted here that although equipment operation of the instant embodiment was made based on its operation at or upon start-up after power-on, substantially the same process is preformed in system start-up subsequent to software or hardware reset, according to the present invention.

It is to be noted also that although the preferred embodiments were described based on T.38 terminal equipment hereinbefore, the present invention may be applied to other JT-H323 terminal equipments equally.

As fully described hereinabove, according to this invention, since the contents of a terminal information table are compared with the contents of a registered terminal information table at or upon start-up after power-on and if a match is not met therebetween registration is made to the gatekeeper equipment after performing unregister operation thereto, it is ensured advantageously that the contents of the terminal information table used in a terminal always match the contents registered in the gatekeeper equipment thereby to enable any associated terminal equipment to use the gatekeeper equipment appropriately.

While the present invention has been described with a preferred embodiment, this description is not intended to limit the invention. Various modifications of the embodiment will be apparent to those skilled in the art. It is therefore contemplated that the appended claims will cover any such modifications or embodiments as fall within the true scope of the invention.

This application claims the priority benefit of Japanese applications Serial No. 2002-039835, filed on Feb. 18, 2002, and Serial No. 2002-347140, filed on Nov. 29, 2002, and hereby incorporates b reference in this application the entire contents of said Japanese applications.

What is claimed is:

1. A communications terminal apparatus which performs a predetermined communications operation by using a packet transmission network as a communication line and uses services provided by a communications management terminal connected to said packet transmission network, said communications terminal apparatus comprising:

means for communicating predetermined communications management messages with said communications management terminal;

first storing means for storing data of a first information table representing registration information of said apparatus to be registered in said communications management terminal;

second storing means for storing data of a second information table for representing registration information of said apparatus previously registered in said communications management terminal; and control means operating at or upon start-up for comparing registration information of said first information table with registration information of said second information table, sending a first message to said communications management terminal containing the registration information of said second information table to cause said communications management terminal to delete registration information of said apparatus previously registered in said communications management terminal when the registration information of said first information table differs from the registration of said second information table, sending a second message to said communications management terminal containing the registration information of said first information table to cause said communications management terminal to newly register the registration information of said first information table, and saving the registration information of said first information table into said second information table.

2. The communications terminal apparatus according to claim 1, wherein said predetermined communications operation includes a communications operation conforming to TTC JT-H323 Standard, said communications management terminal includes a gatekeeper, said predetermined communications management messages include a RAS message, said first message includes a predetermined URQ message, and said second message includes a predetermined RRQ message.

3. The communications terminal apparatus according to claim 2, wherein said registration information includes information of a call signaling channel port number.

4. The communications terminal apparatus according to claim 2, wherein said registration information includes information of an alias registered in or assigned to said communications terminal apparatus.

5. The communications terminal apparatus according to claim 2, wherein said registration information includes an IP address of said gatekeeper.

6. The communications terminal apparatus according to claim 2, wherein said registration information includes information of a UDP port number for communicating the RAS message with said gatekeeper.

7. The communications terminal apparatus according to claim 2, wherein said registration information includes an IP address assigned to said communications terminal apparatus.

8. A communications system comprising:

a communications management terminal connected to a packet transmission network; and a plurality of communications terminal apparatuses using the packet transmission network as a communication line and services provided by said communications management terminal, wherein, each of said plurality communications terminal apparatuses comprises:

means for communicating predetermined communications management messages with said communications management terminal;

first storing means for storing data of a first information table representing registration information of said apparatus required to be registered in said communications management terminal;

second storing means for storing data of a second information table representing registration information of said apparatus previously registered in said communications management terminal; and control means operating at or upon start-up for comparing registration information of said first information table with registration information of said second information table, sending a first message to said communications management terminal containing the registration information of said second information table to cause said communications management terminal to delete registration information of said apparatus previously registered in said communications management terminal when the registration information of said first information table differs from the registration information of said second information table, sending a second message to said communications management terminal containing the registration information of said first information table to cause said communications management terminal to newly register the registration information of said first information table, and saving the registration information of said first information table into said second table, and wherein said communications management terminal comprises:

registration information management means for deleting registration information of said plurality of communications terminal apparatuses previously registered therein, upon receiving said first message from one of said plurality of communications terminal apparatuses, and registering registration information of said one of said plurality of communications terminal apparatuses using information contained in said second message upon receiving said second message from said one of said plurality of communications terminal apparatuses.

9. A communications terminal apparatus which performs a predetermined communications operation by using a packet transmission network as a communications line and uses services provided by a communications management terminal connected to said packet transmission network, said communications terminal apparatus comprising:

a communications mechanism configured to communicate predetermined communications management messages with said communications management terminal;

a first memory storing data of a first information table representing registration information of said apparatus to be registered in said communications management terminal;

a second memory storing data of a second information table representing registration information of said apparatus previously registered in said communications management terminal; and a controlling mechanism operating at or upon start-up to compare registration information of said first information table with registration information of said second information table, to send a first message to said communications management terminal containing the registration information of said second information table to cause said communications management terminal to delete registration information of said apparatus previously registered in said communications management terminal when the registration information of said first information table differs from the registration information of said second information table, to send a second message to said communications management terminal containing the registration information of said first information table to cause said communications management terminal to newly register the registration information of said first information table, and to save the registration information of said first information table into said second information table.

10. The communications terminal apparatus according to claim 9, wherein said predetermined communications operation includes a communications operation conforming to TTC JT-H323 Standard, said communications management terminal includes a gatekeeper, said predetermined communications management messages include a RAS message, said first message includes a predetermined URQ message, and said second message includes a predetermined RRQ message.

11. The communications terminal apparatus according to claim 10, wherein said registration information includes information of a call signal channel port number.

12. The communications terminal apparatus according to claim 10, wherein said registration information includes information of an alias registered in or assigned to said communications terminal apparatus.

13. The communications terminal apparatus according to claim 10, wherein said registration information includes an IP address of said gatekeeper.

14. The communications terminal apparatus according to claim 10, wherein said registration information includes information of a UDP port number for communicating the RAS message with said gatekeeper.

15. The communications terminal apparatus according to claim 10, wherein said registration information includes an IP address assigned to said communications terminal apparatus.

16. A communications system, comprising;

a communications management terminal connected to a packet transmission network; and a plurality of communications terminal apparatuses using the packet transmission network as a communication line and having a function for using services provided by said communications management terminal, wherein each of said plurality communications terminal apparatuses comprises;

a communications mechanism configured to communicate predetermined communications management messages with said communications management terminal;

a fist memory storing data of a first information table representing registration information of said apparatus required to be registered in said communications management terminal;

a second memory storing data of a second information table representing registration information of said apparatus previously registered in said communications management terminal; and a controlling mechanism operating at or upon start-up to compare registration information of said first information table with registration information of said second information table, send a first message to said communications management terminal containing the registration information of said second information table to cause said communications management terminal to delete registration information of said apparatus previously registered in said communications management terminal when the registration information of said first information table differs from the registrations information of said second information table; send a second message to said communications management terminal with reference to the registration information of said first information table to cause said communications management terminal to newly register the registration information of said first information table, and save the registration of said first information table in said second table, and wherein said communications management terminal comprises:

registration information management means for deleting registration information of said one of plurality of communications terminal apparatuses previously registered therein, upon receiving said first message front one of said plurality of communications terminal apparatuses, and registering registration information of said one of said plurality of communications terminal apparatuses using information contained in said second message upon receiving said second message from said one of said plurality of communications terminal apparatuses.

17. A communications management method for a communication system which includes a communications management terminal connected to a packet transmission network and a plurality of communications terminal apparatuses which perform a predetermined communications operation and use the packet transmission network as a communication line and services provided by said communications management terminal, said method comprising the steps of:

storing into a first memory registration information of one of said plurality of communications terminal apparatuses;

registering previously in said communications management terminal said registration information of said one of said plurality of communications terminal apparatuses stored in said first memory by said storing step;

saving into a second memory said registration information of said one of said plurality of communications terminal apparatuses registered in said communications management terminal;

updating the registration in formation of said one of said plurality of communications terminal apparatuses stored in said first memory by said storing step; and performing the following at or upon start-up of said one of said plurality of communications terminal apparatuses:

comparing the registration information stored in said first memory by said storing step with the registration information saved in said second memory by said saving step;

sending a first RAS message to said communications management terminal containing the registration information saved in said second memory by said saving step when said registration information stored in said first memory by said storing step differs from the registration information saved in said second memory by said saving step;

deleting the registration information of said one of said plurality of communications terminal apparatuses previously registered in said communications management terminal upon a receipt of said first RAS message from said one of plurality of communications terminal apparatuses by said communications management terminal;

transmitting a second RAS message to said communications management terminal containing the registration information in said first memory updated by said updating step;

updating the registration information of said second memory with the registration information of said first memory updated by said updating step; and registering newly the registration information of said one of communications terminal apparatuses contained in the second message transmitted from said one of said plurality of communications terminal apparatuses upon receipt of said second RAS message from said one of said plurality of communications terminal apparatuses by said communications management terminal.

18. The communications management method according to claim 17, wherein said predetermined communications operation includes a communications operation conforming to TTC JT-H323 Standard, said communications management terminal includes a gatekeeper, said first RAS message includes a predetermined URQ message, and said second RAS message includes a predetermined RRQ message.

19. The communications management method according to claim 18, wherein said registration information includes information of a call signaling channel port number.

20. The communications management method according to claim 18, wherein said registration information includes information or an alias registered in or assigned to said communications terminal apparatus.

21. The communications management method according to claim 18, wherein said registration information includes an IP address of said gatekeeper.

22. The communications management method according to claim 18, wherein said registration information includes information of a UDP port number for communicating the RAS message with said gatekeeper.

23. The communications management method according to claim 18, wherein said registration information includes an IP address assigned to said communications terminal apparatus.

* * * * *